(12) United States Patent
Fukunaga

(10) Patent No.: US 10,337,082 B2
(45) Date of Patent: Jul. 2, 2019

(54) HEARTH ROLL AND CONTINUOUS ANNEALING FACILITY

(71) Applicant: JFE STEEL CORPORATION, Tokyo (JP)

(72) Inventor: Takayuki Fukunaga, Kurashiki (JP)

(73) Assignee: JFE STEEL CORPORATION, Tokyo (JP)

( * ) Notice: Subject to any disclaimer, the term of this patent is extended or adjusted under 35 U.S.C. 154(b) by 168 days.

(21) Appl. No.: 15/510,936

(22) PCT Filed: Sep. 29, 2015

(86) PCT No.: PCT/JP2015/077450
§ 371 (c)(1),
(2) Date: Mar. 13, 2017

(87) PCT Pub. No.: WO2016/052474
PCT Pub. Date: Apr. 7, 2016

(65) Prior Publication Data
US 2017/0275731 A1   Sep. 28, 2017

(30) Foreign Application Priority Data
Oct. 3, 2014 (JP) .................. 2014-204649

(51) Int. Cl.
*C21D 9/56* (2006.01)
*C04B 37/00* (2006.01)
(Continued)

(52) U.S. Cl.
CPC .............. *C21D 9/563* (2013.01); *B32B 18/00* (2013.01); *C04B 35/584* (2013.01);
(Continued)

(58) Field of Classification Search
CPC ..... B32B 18/00; C04B 35/584; C04B 37/001; C21D 9/56; C21D 9/563; C21D 9/5737; F27D 3/026
(Continued)

(56) References Cited

U.S. PATENT DOCUMENTS 5,070,587 A * 12/1991 Nakahira .............. B21B 39/008
432/246
5,700,423 A    12/1997 Gao
(Continued)

FOREIGN PATENT DOCUMENTS

JP   S61-133544 U   8/1986
JP   H01-176021 A   7/1989
(Continued)

OTHER PUBLICATIONS

Jan. 31, 2018 Office Action issued in Japanese Patent Application No. 2014-204649.
(Continued)

*Primary Examiner* — Scott R Kastler
*Assistant Examiner* — Michael Aboagye
(74) *Attorney, Agent, or Firm* — Oliff PLC

(57) ABSTRACT

Provided is a hearth roll for supporting and conveying a steel sheet in a continuous annealing furnace, wherein all of a shaft portion and a roll main body are made from one or more ceramic materials, preferably constituted with concentric ceramic layers of different ceramic materials centering on the rotation shaft of the roll. The hearth roll has not only an excellent pickup resistance but also a long roll life free from maintenance for long periods. Also provided is a continuous annealing facility using the hearth roll in at least one of a heating zone, a soaking zone and a cooling zone.

6 Claims, 1 Drawing Sheet

(51) Int. Cl.
   *C21D 9/573* (2006.01)
   *C04B 35/584* (2006.01)
   *B32B 18/00* (2006.01)
   *F27D 3/02* (2006.01)
   *C21D 9/46* (2006.01)

(52) U.S. Cl.
   CPC .............. *C04B 37/001* (2013.01); *C21D 9/56* (2013.01); *C21D 9/5737* (2013.01); *F27D 3/026* (2013.01); *C04B 2235/3873* (2013.01); *C04B 2235/96* (2013.01); *C04B 2235/9607* (2013.01); *C04B 2235/9676* (2013.01); *C04B 2237/343* (2013.01); *C04B 2237/348* (2013.01); *C04B 2237/365* (2013.01); *C04B 2237/368* (2013.01); *C04B 2237/704* (2013.01); *C04B 2237/84* (2013.01); *C21D 9/46* (2013.01)

(58) Field of Classification Search
   USPC ........................................................ 266/103
   See application file for complete search history.

(56) References Cited

U.S. PATENT DOCUMENTS

| | | | |
|---|---|---|---|
| 6,505,483 B1 * | 1/2003 | Hoetzl | C03B 23/03 198/493 |
| 2002/0169060 A1 | 11/2002 | Dietsch | |
| 2007/0074657 A1 * | 4/2007 | Hamayoshi | C04B 35/593 118/424 |
| 2010/0230874 A1 | 9/2010 | Kurisu et al. | |

FOREIGN PATENT DOCUMENTS

| | | |
|---|---|---|
| JP | H06-65708 A | 3/1994 |
| JP | H06-93342 A | 4/1994 |
| JP | H06-287643 A | 10/1994 |
| JP | H10-183260 A | 7/1998 |
| JP | H10-311685 A | 11/1998 |
| JP | 2003-013147 A | 1/2003 |
| JP | 2005-232482 A | 9/2005 |
| JP | 2005-281791 A | 10/2005 |
| JP | 2014-069199 A | 4/2014 |
| KR | 2007-0115268 A | 12/2007 |
| RU | 2246085 C2 | 2/2005 |
| SU | 540783 A1 | 12/1976 |
| TW | 300921 B | 3/1997 |
| TW | I397589 B | 6/2013 |

OTHER PUBLICATIONS

Nov. 6, 2017 Office Action issued in Chinese Patent Application No. 201580048789.0.
Jun. 28, 2017 Office Action issued in Japanese Patent Application No. 2014-204649.
Aug. 31, 2017 extended Search Report issued in European Patent Application No. 15845836.4.
Jun. 1, 2018 Office Action issued in Russian Patent Application No. 2017110811.
Jun. 12, 2017 Office Action issued in Taiwanese Patent Application No. 104132568.
Aug. 21, 2018 Office Action issued in Korean Patent Application No. 10-2017-7006588.
Dec. 22, 2015 International Search Report issued in International Patent Application No. PCT/JP2015/077450.
Feb. 6, 2019 Office Action issued in European Patent Application No. 15845836.4.
Nov. 13, 2018 Office Action issued in Chinese Patent Application No. 201580048789.0.
Huang, Yong et al., "Design of Laminate-Structure Composite Ceramics," Multiphase Composite Ceramics with High Performance, pp. 355-358, Feb. 2008.

* cited by examiner

HEARTH ROLL AND CONTINUOUS ANNEALING FACILITY

TECHNICAL FIELD

This invention relates to a hearth roll disposed in a continuous annealing furnace in which a steel sheet is subjected to a continuous heat treatment while being conveyed, and a continuous annealing facility using the hearth roll.

RELATED ART

A continuous annealing facility is a facility for continuously subjecting a steel sheet to a heat treatment wherein a coil-shaped steel sheet is unwound at an inlet side of the furnace into a sheet shape, introduced into the furnace held at a high temperature, continuously subjected to a heat treatment while being supported and conveyed with rolls and the like, cooled and taken out to an outside of the furnace and again wound into a coil. It is widely used as an annealing facility for a cold rolled steel sheet, a stainless steel sheet, an electrical steel sheet and the like in recent years.

A hearth roll is disposed in the furnace of the continuous annealing facility for conveying the steel sheet while supporting, and is conventionally made from a heat resistant steel, heat resistant alloy or the like in use. However, the hearth roll is continuously used in the furnace held at a high temperature of 700-1300° C. under an oxidizing atmosphere or a reducing atmosphere for a long time, so that there is a problem that roll deformation (bending), pickup and the like are often caused. Here, the pickup (also referred to as "buildup") means that iron, iron oxides, manganese oxides and the like existing in the surface of the steel sheet are deposited onto an outer peripheral surface of the hearth roll. If the pickup is caused, flaws are generated on the steel sheet supported and conveyed by the hearth roll to significantly deteriorate the product quality.

As a technique for solving the above problem, there are developed a hearth roll formed by thermal spraying a ceramic material onto a surface of a base material of a metal roll, a hearth roll formed by attaching a ceramic sleeve, a carbon sleeve or the like to a metal roll, and so on. For example, Patent Document 1 discloses a hearth roll for a heat-treating furnace having on a surface portion of a base material made from a heat-resistant cast steel a thermal sprayed coating comprising a Zr-based silicide $ZrSi_2$ of 10-70 vol % of the total and the remainder being a Zr-based oxide containing one or more of MgO, CaO and $Y_2O_3$ in 5-20% by weight and being excellent in the buildup resistance, high-temperature stripping resistance and high-temperature wear resistance. Also, Patent Document 2 discloses a hearth roll in which a shaft of a metal roll is covered with a ceramic sleeve and at least one of both ends of the sleeve is elastically pressed in its shaft direction with a pressing member using the shaft of the roll as a seat for suppressing cracks easily caused in the fixation of the sleeve, while a metal thin sheet is disposed at a state of winding in a coil form between an inner surface and an outer surface of the sleeve at both end portions thereof. Patent Document 3 discloses a hearth roll for a heat-treating furnace in which a carbon sleeve having a pickup resistance is fitted into a metal core body.

PRIOR ART DOCUMENTS

Patent Documents

Patent Document 1: JP-A-H06-065708
Patent Document 2: JP-A-H01-176021
Patent Document 3: JP-A-2005-281791

SUMMARY OF THE INVENTION

Task to be Solved by the Invention

However, the roll formed by thermal spraying the ceramic material onto the surface of the base material of the metal roll as disclosed in Patent Document 1 is excellent in the pickup resistance, but exfoliation may be easily caused depending on the temperature, atmosphere or the like of the furnace, so that the range of applying the roll is limited. Also, the ceramic thermal sprayed coating is easily worn by friction with the steel sheet and the replacement cycle of the roll is as short as some years, so that there is a problem in the maintenance. The roll formed by covering the shaft of the metal roll with the ceramic sleeve as disclosed in Patent Document 2 is excellent in the pickup resistance. However, since it is necessary to cover the shaft of the metal roll with the sleeve, the fixed portion may be broken, or bending may be caused in the roll due to the difference of thermal expansion between metal and ceramic, and hence it is necessary to replace the roll for a short period of about a half year or repair the fixed portion. Also, the hearth roll covered with the carbon sleeve in Patent Document 3 has similar problems.

As described above, each of the conventional hearth rolls has a problem in the durability, and it is necessary to frequently replace or repair the roll, which is a large burden in the maintenance of the facility.

The invention is made in view of the aforementioned problems inherent to the conventional techniques, and is to provide a hearth roll having an excellent pickup resistance as well as a long roll life free from maintenance over a long period of time, and a continuous annealing facility using the hearth roll.

Solution for Task

The inventors have focused on a raw material constituting the hearth roil and made various studies for solving the above task. As a result, it has been found that a hearth roll having an excellent pickup resistance and being free from maintenance over a long period of time can be obtained by constituting the whole of the hearth roll with one or more ceramic materials, and the invention has been accomplished.

That is, the invention is a hearth roll for supporting and conveying a steel sheet in a continuous annealing furnace, characterized in that all of a shaft portion and a main body of the roll are made from one or more ceramic materials.

The hearth roll of the invention is characterized by constituting with concentric ceramic layers made from different ceramic materials centering on a rotation axis of the roll.

The hearth roll of the invention is characterized in that the shaft portion and the roll main body are made from different ceramic materials.

Also, the hearth roll of the invention is characterized in that the roll main body is constituted with different ceramic layers.

Further, the ceramic material in the hearth roil of the invention is characterized by having a high-temperature strength of not less than 200 MPa and a thermal shock resistance of not lower than 350° C.

The hearth roll of the invention is characterized in that a ratio of thermal expansion coefficient of the ceramic material in an inner layer to the ceramic material in an outer layer within an operating temperature range is a range of 0.5-1.5.

The ceramic material in the hearth roll of the invention is characterized by being any one of silicon nitride, silicon carbide, alumina and zirconia.

Further, the invention is a continuous annealing facility characterized by using any one of the above-described hearth rolls in at least one of a heating zone, a soaking zone and a cooling zone of the facility.

Also, the continuous annealing facility of the invention is characterized by using the hearth roll in a section having an internal temperature of 700-1300° C. in the heating zone, soaking zone and cooling zone.

Effect of the Invention

According to the invention, the whole of the heath roll in the continuous annealing facility including the shaft portion and the roll main body is made from one or more ceramic materials, so that pickup can be suppressed to remarkably improve a surface quality of a product steel sheet and also deformation of the hearth roll and the like can be significantly reduced, and hence the replacement of the hearth roll is not necessary over a period of not less than 10 years, which can not only attain the maintenance-free state but also largely contribute to improve the productivity.

EMBODIMENTS FOR CARRYING OUT THE INVENTION

Figure 1:
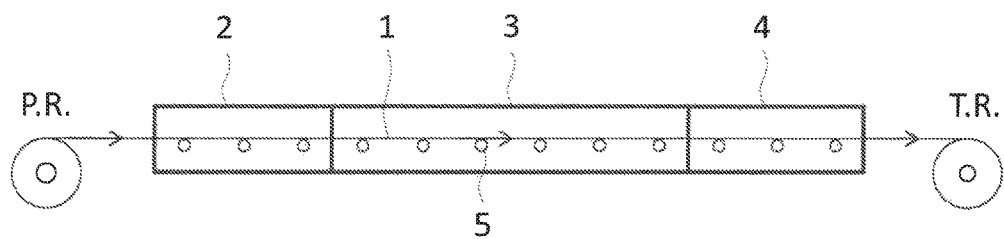
FIG. 1 is a schematic view illustrating an outline of a continuous annealing facility capable of applying the hearth roll according to the invention.

FIG. 1 is a schematic view illustrating a lateral-type (horizontal-type) continuous annealing facility for continuously subjecting a steel sheet to a heat treatment by heating while being conveyed in a horizontal direction wherein a steel sheet 1 unwound from a coil by a pay-off reel (PR) at an inlet side is subjected to a heat treatment of heating, soaking and cooling while being continuously passed through a heating zone 2, a soaking zone 3 and a cooling zone 4 and again wound into another coil by a tension reel (TR) at an outlet side. It is common that a welding machine for continuously passing steel sheets, a cleaning equipment for removing a rolling oil or the like from the steel sheet, a looper equipment and so on are disposed between the pay-off reel and the heating zone 2, and a looper equipment, a temper rolling equipment and so on are disposed between the cooling zone 4 and the tension reel, which are not shown in FIG. 1.

Since the steel sheet to be treated is subjected to the heat treatment in the heating zone 2 and the soaking zone 3 for providing desired material properties, it is common that the inside of such zones is heated to a temperature of not less than 700° C. but not more than 1300° C. Moreover, the heating zone 2 is often heated with a direct heating method by directly injecting flames onto the steel sheet or an indirect heating method through a radiant tube, and the soaking zone 3 is often heated with an indirect heating method through a radiant tube or an electric heater.

Figure 2:
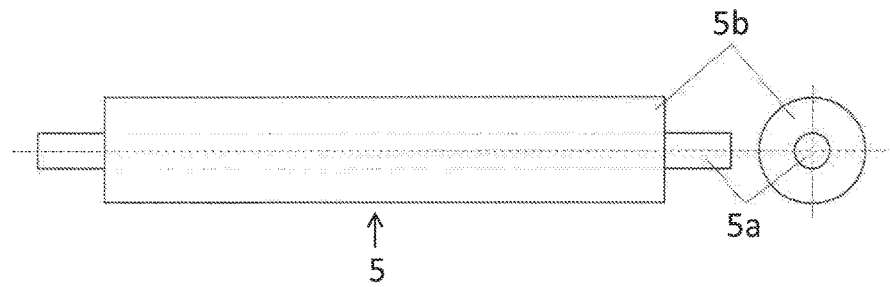
FIG. 2 is a schematic view illustrating a structure of the hearth roll according to the invention.

A hearth roll 5 for supporting and conveying the steel sheet in the heating zone 2, the soaking zone 3 and the cooling zone 4 is general to have a structure comprising a shaft portion 5a as a rotation center of the roll and a roll main body 5b formed on the circumference of the shaft portion and having an outer peripheral surface in contact with the steel sheet as shown in FIG. 2. Heretofore, a hearth roll formed by mounting a sleeve made from ceramic or carbon on the circumference of the shaft portion made from heat resistance steel has been mainly used as a countermeasure for pickup. However, although the above-described hearth roll is excellent in the pickup resistance, the roll life is short due to the deformation or wearing of the roll, and it is necessary to frequently perform the maintenance such as roll replacement, repairing and the like.

The invention is to solve the above problem by constituting the whole of the hearth roll including the shaft portion and the roll main body with one or more ceramic materials only.

As the ceramic material usable for the hearth roll of the invention are included silicon nitride $Si_3N_4$, silicon carbide SiC, alumina $Al_2O_3$, zirconia $ZrO_2$ and a mixture thereof, any of which can be preferably used. Moreover, the hearth roll is basically a hollow roll but may be a solid roll.

Among the above-described ceramic materials, it is preferable to use a ceramic material having a high-temperature strength of not less than 200 MPa and a thermal shock resistance of not lower than 350° C.

When the high-temperature strength is less than 200 MPa, there is a risk of causing breakup in the case that stress is concentrated on a local portion of the roll. When the thermal shock resistance is lower than 350° C., there is a limitation in the temperature opening the furnace for maintenance or the like and hence the down time is increased. More preferably, the high-temperature strength is not less than 300 MPa and the thermal shock resistance is not lower than 700° C.

In this regard, the high-temperature strength means a bending strength at a temperature of 1300° C. measured by a method defined in JIS R1604.

Further, the thermal shock resistance means a temperature difference causing no cracks in the quenching measured by a method defined in JIS R1648.

Incidentally, representative values of the high-temperature strength and the thermal shock resistance of the above-described ceramic materials are shown in Table 1 together with thermal expansion coefficients described below for reference. As a raw material for the roll, it is preferable to use silicon nitride $Si_3N_4$ or silicon carbide SiC from a viewpoint of the thermal shock resistance.

| | Characteristic value | | |
|---|---|---|---|
| | High-temperature strength (MPa) | Thermal shock resistance (° C.) | Thermal expansion coefficient of 40-400° C. ($10^{-6}$/° C.) |
| Silicon nitride $Si_3N_4$ | 900 | >800 | 2.6 |
| Silicon carbide SiC | 540 | 350 | 4.4 |
| Zirconia $ZrO_2$ | 560 | 300 | 10.5 |
| Alumina $Al_2O_3$ | 250 | 200 | 7.2 |

In the hearth, roll of the invention, a hearth roll may be made from one of the above ceramic materials or only one of mixtures of the above ceramic materials, or may be made from two or more of ceramic materials having different characteristics. When the roll is made from two or more ceramic materials, it is preferable to be a multilayer structure constituted with a plurality of concentric ceramic layers centering on the roll shaft.

As an example of the multilayer structure, for example, the shaft portion as the roll shaft and the roll main body as the outer peripheral portion of the shaft portion (portion in contact with the steel sheet) may be formed from different ceramic materials, and the roll main body may have a multilayer structure constituted with a plurality of ceramic layers of different materials.

In the case of the multilayer structure as mentioned above, however, it is preferable that a ratio of thermal expansion coefficient of the ceramic material in the inner layer to the ceramic material in the outer layer is within a range of 0.5-1.5. When the ratio of thermal expansion coefficient of the inner layer to the outer layer is larger than the above range, stress is caused due to the thermal expansion difference to bring about cracks (fracture). On the other hand, when it is smaller than the above range, there is a risk that the multilayer structure cannot be attained because the difference of thermal expansion coefficient among the ceramic materials is large as seen from the values of thermal expansion coefficient shown in Table 1. More preferably, the ratio of thermal expansion coefficient is in a range of 0.9-1.1. Moreover, the thermal expansion coefficient is a measurement example of a linear expansion coefficient of 40 to 400° C. measured by a method defined in JIS R1618, which is an approximate value.

When the hearth roll has a multilayer structure of not less than 3 layers, it is preferable to satisfy the above relation among all the layers. For example, when the three-layer structure comprises an outer layer, a middle layer and an inner layer, it is preferable to satisfy the above relation not only between the outer layer and the middle layer but also between the middle layer and the inner layer.

As a method of manufacturing the hearth roll with the multilayer structure, there are a method of performing shrink-fitting, a method of pinning mechanically and so on, any of which may be used.

The hearth roll satisfying the above condition can be preferably used as a hearth roll in the continuous annealing furnace. Particularly, the hearth roll of the invention is excellent not only in the pickup resistance, high-temperature strength and thermal shock resistance but also in the wear resistance in the rubbing with the steel sheet, so that it is preferably used in a heating zone, soaking zone and cooling zone having an internal temperature of 700-1300° C. When the internal temperature is lower than 700° C., no pickup is caused and neither the thermal shock resistance nor high-temperature strength is required, so that the conventional hearth roll is sufficiently applicable. While, when it exceeds 1300° C., the temperature of the steel sheet becomes close to a melting point to lower the strength, so that it is difficult to convey the steel sheet. Moreover, it is the most effective to use the hearth roll of the invention in a section having an internal temperature of not lower than 1000° C.

As the continuous annealing facility, there are a lateral-type (horizontal-type) furnace wherein the steel sheet is subjected to a heat treatment by supporting with the hearth rolls and conveying in a horizontal direction and in one direction, and a vertical-type furnace wherein the steel sheet is subjected to a heat treatment while reversing the conveying direction many times through the hearth rolls in the furnace. The hearth roll according to the invention may be applied to any of these furnaces. However, the hearth roll used in the vertical-type furnace is necessary to avoid application of bending strain to the steel sheet in the reversing of the conveying direction, so that it is common to increase the roll size (diameter) to several hundred mm. When such a large-size hearth roll is manufactured with one or more ceramic materials only, the increase of the roll cost is caused. To this end, the hearth roll according to the invention is desirable to be applied to the lateral-type continuous annealing facility using hearth rolls with a small size of not more than 300 mmφ, but may be used in the vertical-type continuous annealing if it is possible to increase the size with the advancement of technology.

EXAMPLE

A hearth roll comprising a shaft portion and a roll main body made from silicon nitride $Si_3N_4$ only and having a shaft diameter of 40 mmφ, a sleeve outer diameter of 150 mmφ and a roll main body length of 2600 mm is disposed in a section having an internal temperature of not lower than 800° C. at a heating zone and a soaking zone in a lateral-type continuous annealing facility for a cold rolled steel sheet having a construction shown in FIG. 1 and continuously used for one year to measure a change in a displacement amount of the roll and a worn amount of an outer peripheral surface of the roll. Moreover, the highest temperature of the heating zone and soaking zone is 1150° C. in the operation of the continuous annealing facility.

In this regard, the displacement amount of the roll means a maximum value when a displacement change of an outer peripheral surface in the roll is measured over the full length of the roll during the rotation, and changes after a use for one year are investigated.

Also, the worn amount of the outer peripheral surface of the roll means a maximum value when the worn amount of the outer peripheral surface after the use for one year is measured over the full length of the roll.

Further, a rate of surface defects generated due to the pickup during use is studied.

As a comparative example, similar studies are made in a case of using a conventional ceramic sleeve roll comprising a shaft portion made from heat-resistant steel and a roll main body made from silicon nitride $Si_3N_4$.

The results are shown in Table 2. As seen from these results, when the conventional ceramic sleeve roll is used, bending is caused in the shaft portion of the roll after the use over 6 months to increase the displacement amount of the roll exceeding an allowable range (not more than 1.5 mm), so that the replacement of the roll is required without waiting for one-year use.

On the contrary, when the hearth roll of the invention is used, the displacement amount of the roll is hardly changed even after the use for one year, and the worn amount of the outer peripheral surface of the roll is 0.08 mm at maximum, from which it is estimated that the roll life is well over 10 years.

Further, the rate of surface defects generated in a product steel sheet due to the pickup by the hearth roll according to the invention is a superior value even after one year from the start of use as compared to the value after six-month use in the hearth roll of the comparative example having a shaft portion made from heat resistant steel.

TABLE 2

|  |  | Invention Example | Comparative Example |
|---|---|---|---|
| Material of hearth roll | Shaft portion | Si$_3$N$_4$ | Heat resistance steel |
|  | Sleeve portion | Si$_3$N$_4$ | Si$_3$N$_4$ |
| Increment of displacement amount (mm) |  | 0.12 | Exceed 1.5 mm after 6 month use |
| Maximum value of worn amount (mm) |  | 0.08 | Cannot be measured due to deformation |
| Rate of surface defects generated (%) |  | 0.03 | 0.04 |

DESCRIPTION OF REFERENCE SYMBOLS

1: Steel sheet
2: Heating zone
3: Soaking zone
4: Cooling zone
5: Hearth roll
5a: Shaft portion
5b: Roll main body

The invention claimed is:

1. A hearth roll for supporting and conveying a steel sheet in a furnace of a continuous annealing facility having a heating zone, a soaking zone and a cooling zone, wherein the hearth roll comprises a shaft portion made of a ceramic material as a rotation center of the roll and a roll main body made of a ceramic material formed on the circumference of the shaft portion and having an outer peripheral surface in contact with the steel sheet, wherein the hearth roll is constituted with concentric ceramic layers made from different ceramic materials centering on a rotation axis of the roll, and a ratio of thermal expansion coefficient of the ceramic material in an inner layer to the ceramic material in an outer layer within an operating temperature range is in a range of 0.5-1.5.

2. The hearth roll according to claim 1, wherein the shaft portion and the roll main body are made from different ceramic materials.

3. The hearth roll according to claim 1, wherein the roll main body is constituted with different ceramic layers.

4. The hearth roll according to claim 2, wherein the roll main body is constituted with different ceramic layers.

5. The hearth roll according to claim 1, wherein the ceramic material has a high-temperature strength of not less than 200 MPa and a thermal shock resistance of not lower than 350° C.

6. The hearth roll according to claim 1, wherein the ceramic material is any one of silicon nitride, silicon carbide, alumina and zirconia.

* * * * *